US008444803B2

(12) United States Patent
Gomart

(10) Patent No.: US 8,444,803 B2
(45) Date of Patent: May 21, 2013

(54) METHOD FOR MAKING AN INSULATING AND TIGHT WALL FOR A TANK

(75) Inventor: Bruno Gomart, Saint Vincent de Mercuze (FR)

(73) Assignee: Alstom, Levallois-Perret (FR)

( * ) Notice: Subject to any disclaimer, the term of this patent is extended or adjusted under 35 U.S.C. 154(b) by 445 days.

(21) Appl. No.: 12/450,057

(22) PCT Filed: Jan. 17, 2008

(86) PCT No.: PCT/FR2008/000057
§ 371 (c)(1),
(2), (4) Date: Aug. 9, 2010

(87) PCT Pub. No.: WO2008/107546
PCT Pub. Date: Sep. 12, 2008

(65) Prior Publication Data
US 2010/0297379 A1 Nov. 25, 2010

(30) Foreign Application Priority Data
Jan. 23, 2007 (FR) .................................... 07 00438

(51) Int. Cl.
*B32B 3/22* (2006.01)
*B32B 37/02* (2006.01)
*B32B 37/12* (2006.01)

(52) U.S. Cl.
USPC .......................................... 156/295; 428/61

(58) Field of Classification Search
CPC ................................................ B32B 37/1292
USPC ........................................ 428/61; 156/295
See application file for complete search history.

(56) References Cited

U.S. PATENT DOCUMENTS

| | | | | |
|---|---|---|---|---|
| 5,501,359 | A | 3/1996 | Chauvin et al. | |
| 5,586,513 | A | 12/1996 | Jean et al. | |
| 5,686,169 | A | 11/1997 | Hassall et al. | |
| 6,035,795 | A * | 3/2000 | Dhellemmes et al. ...... | 114/74 A |

FOREIGN PATENT DOCUMENTS

| | | |
|---|---|---|
| JP | 6152679 | 3/1986 |
| JP | 61091353 | 5/1986 |

* cited by examiner

*Primary Examiner* — Alexander Thomas
(74) *Attorney, Agent, or Firm* — Abelman, Frayne & Schwab

(57) ABSTRACT

The invention relates to a method for making the wall of a heat-insulated fluid-confinement tank, such as for a liquefied gas, that is integrated in the carrier structure (50) of a ship, wherein a prefabricated substantially rectangular block (25) is assembled on top of a flexible mat strip (35), the assembling of said block comprising the following steps: applying two longitudinal parallel strips of glue (26, 26') on the lower surface of said block (25), said strips (26, 26') being separated by a glue-free central longitudinal space (28); gluing said glued block (25) on a flexible mat strip (35) by pressing said glued block (25) on said flexible mat strip (35) so that after gluing, said longitudinal central space (28) is at least partially filled with glue, thus defining a substantially continuous glue layer on the lower surface of the block (25), said substantially continuous glue layer reinforcing the gluing of said flexible mat strip (35) in order to ensure tightness.

10 Claims, 1 Drawing Sheet

METHOD FOR MAKING AN INSULATING AND TIGHT WALL FOR A TANK

This present invention concerns a method for the creation of an insulating and sealed wall for a tank, incorporated into a bearing structure, such as the hull of a ship for example.

Figure 1:
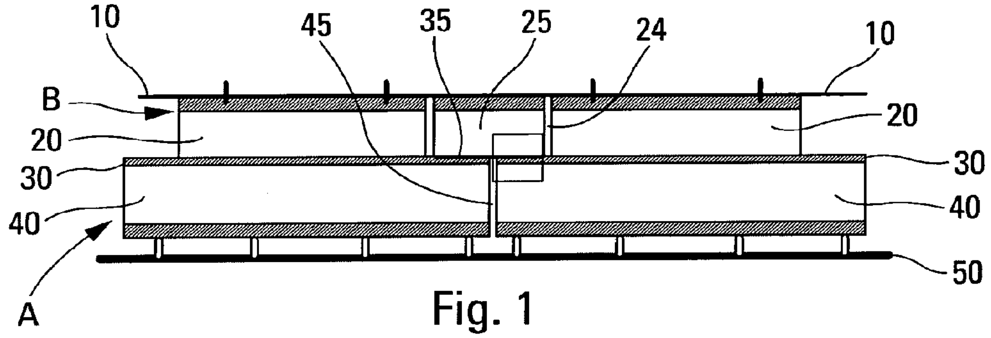

These tanks can be those used in ships for the transportation of liquefied gas for example. They must be perfectly sealed and sufficiently insulating to contain liquefied gas at low temperature and to limit its evaporation. Referring to FIG. 1, these walls are generally composed of two successive sealing membranes, the first a primary membrane 10 in contact with the product contained in the tank and the other a secondary membrane 30 placed between the primary membrane 10 and the bearing structure 50, with these two membranes being alternated with two thermally insulating barriers 20, 40. We are thus familiar with tank walls composed of a primary insulation 20 associated with a primary membrane 10 in INVAR or in stainless steel, and with a secondary insulation 40 associated with a flexible or rigid secondary membrane 30. This secondary membrane 30 includes at least one continuous thin metallic sheet, in aluminium for example, glued in a sandwich between two glass fibre fabrics, with a binder possibly ensuring cohesion between the glass fabric and the aluminium. Invar is a steel with 36% of nickel that is thermally stable between minus 200° C. and plus 400° C. The insulating and sealed walls of these tanks are preferably created by the assembly of a set of prefabricated panels. By current standards, each prefabricated panel has the general shape of a rectangular parallelepiped, with the primary insulation element 20 and the secondary insulation element 40, when seen from above, respectively having the shape of a first rectangle and of a second rectangle whose sides are more-or-less parallel, with the lengths and/or the width of the first rectangle being less than those of the second rectangle, in order to create a peripheral lip. The peripheral lips of the adjacent secondary insulation elements 40 and the lateral walls of the primary insulation elements 20 form channels 24, which can extend over the full length, width or height of the tank. The continuity of the primary insulation 20 is achieved by inserting baseplates 25 in the channels 24. In order to ensure the continuity of the secondary membrane 30, at the level of the junction between two adjacent panels, the said peripheral lips are covered, before the installation of the said baseplates 25, with a flexible sheet strip 35, including at least one continuous thin metallic sheet. The fitting of these different panels necessitates very strict procedures and a high degree of fitting precision, in order to guarantee the thermal insulation and the sealing of the tank. The gluing of the flexible sheet strip 35 and the seal thus created between two adjacent panels must be particularly precise and robust, in order to cope with the various mechanical stresses and to achieve performance over time. In fact the tanks of such ships are subjected to many stresses. Thus, the cooling of the tank before it is filled to very low temperatures, of the order of −160° C. for methane for example, or even as low as −170° C., can give rise to stresses due to the different thermal contractions of the materials making up the walls. In addition, when moving, the ship is subjected to many stresses such as those from the swell or the waves, which can result in deformations of its hull and therefore of the walls of the tank as a consequence. The movements of the cargo can also create stresses due to high pressure or back-pressure on the walls of the tank. Thus, the junction zones between adjacent panels are zones which are subjected to various traction, compression and/or shear stresses, and they must therefore maintain good mechanical performance over time, in order not to break the continuity of the secondary seal barrier. However, it turns out that this secondary seal barrier had tended to exhibit some weaknesses, in particular regarding the gluing of the flexible sheet strip.

The invention aims to remedy the aforementioned drawbacks of the prior art.

It aims in particular to propose a method of withstanding the cold, in particular in respect of reproducibility and durability when gluing the flexible sheet strip.

This present invention therefore has as its subject a method for the creation of a wall of a heat-insulated tank for the containment of a fluid, such as a liquefied gas, incorporated into the bearing structure of a ship, where this wall includes a primary sealing membrane in contact with the product contained in the tank, a primary thermal insulation barrier, a secondary sealing membrane and a secondary thermal insulation barrier connected to the bearing structure, with the said secondary sealing membrane and the said secondary thermal insulation barrier being formed by the assembly of prefabricated panels placed side-by-side with an empty space between two adjacent panels, with a flexible sheet strip being glued in the said channel above the said empty space between two adjacent panels, in order to ensure the continuity of the secondary seal, with the said primary thermal insulation barrier being formed by the assembly of prefabricated panels placed onto the panels to form a channel above each empty space, and with a more-or-less rectangular prefabricated baseplate being assembled in each channel above each flexible sheet strip, characterised in that the assembly of the said baseplate includes the following stages:

- application of two parallel longitudinal adhesive strips onto the bottom surface of the said baseplate, with the said strips being separated by a longitudinal central space that has no adhesive,
- gluing of the said glue-treated baseplate in a channel onto a flexible sheet strip, by pressure of the said baseplate onto the said flexible sheet strip, so that after gluing, the said longitudinal central space is at least partially filled with adhesive, thus forming a more-or-less continuous adhesive layer on the bottom surface of the baseplate, and with this more-or-less continuous adhesive layer reinforcing the gluing of the said flexible sheet strip in order to guarantee the seal of the secondary sealing membrane.

Advantageously, during application, the thickness of each longitudinal adhesive strip, for a standard baseplate, is between 3 and 4 mm, advantageously between 3.1 and 3.6 mm, and preferably about 3.4 mm.

Advantageously, during application, the width of each longitudinal adhesive strip is between 90 and 110 mm, and preferably about 100 mm.

Advantageously, for a standard baseplate whose tank side area is 1000 mm×250 mm, the total quantity of adhesive is between 765 g and 935 g, advantageously between 780 g and 920 g, and preferably about 850 g.

Advantageously, for a standard baseplate whose tank side area is 720 mm×250 mm, the total quantity of adhesive is between 550 g and 670 g, advantageously between 560 g and 660 g, and preferably about 610 g.

Advantageously, before the gluing stage, the width of the said longitudinal central space is less than 20 mm, and more than 10 mm.

Advantageously, after the gluing stage, at least 50%, and preferably at least 75%, of the initial area of the longitudinal central space is filled with adhesive.

Advantageously, the said adhesive used to glue the baseplates on the flexible sheet strips is a curable adhesive of the two-component epoxy resin type.

Figure 2:
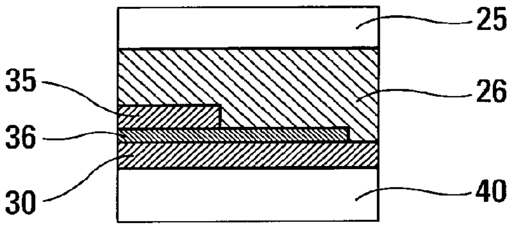
Figure 3:
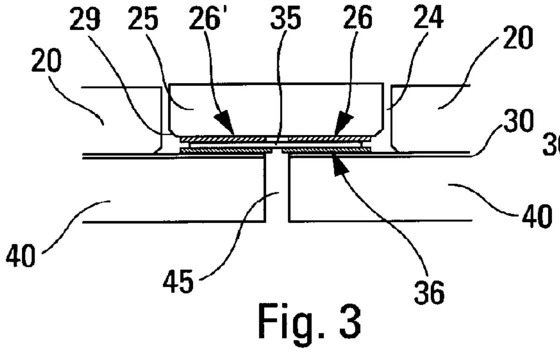
Figure 4:
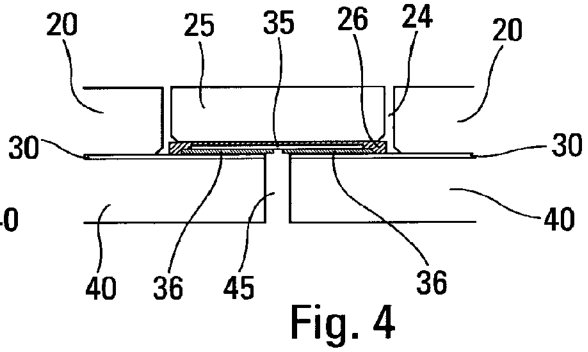
Figure 5:
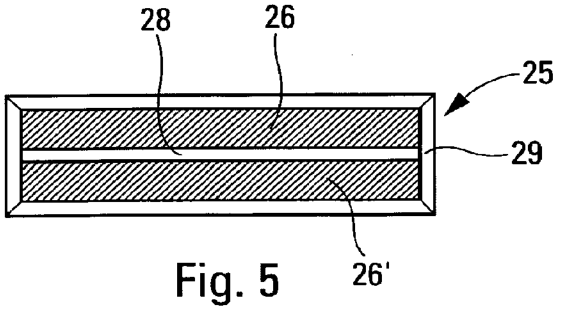

These characteristics and advantages, and others, of this present invention will appear more clearly on reading the description that follows, with reference to the attached drawings, which are provided by way of non-limiting examples, and in which:

FIG. 1 is a schematic view in section of a tank wall to which this present invention can apply, FIG. 2 is a enlarged and schematic detailed view of the framed part of FIG. 1, FIGS. 3 and 4 represent views similar to that of FIG. 1, before and after the fitting of a baseplate respectively, and FIG. 5 is a schematic plan view of the bottom surface of a baseplate, after application of the adhesive and before assembly.

The invention applies to a tank wall such as that represented in FIG. 1, and already described above. More particularly, it concerns the gluing of the baseplates 25 in the channels 24 formed between the panels B of the primary thermal insulation barrier 20, above each flexible sheet strip 35 ensuring the continuity of the secondary sealing membrane 30. Surprisingly, and after much research and many tests, the inventors observed that the gluing characteristics of these baseplates 25 affects the strength of the glue in the flexible sheet strip 35.

Thus, according to the invention, after gluing of the baseplate 25, when the adhesive layer on the latter is more-or-less continuous, then this more-or-less continuous adhesive layer relieves and reinforces the gluing 36 of the flexible sheet strip 35, particularly in the event of high stresses.

According to the invention, the method of gluing of the baseplates 25 in the channels 24 therefore includes the application, onto the bottom surface of a baseplate 25, of two more-or-less rectangular parallel longitudinal adhesive strips, keeping between them a longitudinal central space 28, preferably with a width of less than 20 and more than 10 mm. Advantageously, the peripheral edge 29 is chamfered, in particular in order to guarantee the circulation of nitrogen. It is preferable that a machine be used to apply these adhesive strips 26, 26' in order to ensure their dimensions (width, length and thickness) as well maintaining a substantially constant grammage for each baseplate.

The baseplates 25 can be of various dimensions, but two types of baseplate are used in the main.

Thus, for a standard baseplate with dimensions of 1000×250 mm, the adhesive grammage will be 850 g±10% (that is between 765 g and 935 g), advantageously 850 g±8% (that is between 780 g and 920 g), and preferably about 850 g.

For a standard baseplate with dimensions of 720 mm×250 mm, the adhesive grammage will be 610 g±10% (that is between 550 g and 670 g), advantageously 610 g±8% (that is between 560 g and 660 g), and preferably about 610 g.

During application of the adhesive, the thickness of each adhesive strip 26, 26' for a standard baseplate is between 3 and 4 mm, advantageously between 3.1 mm and 3.6 mm, and preferably about 3.4 mm. The width of each adhesive strip 26, 26' is between 90 and 110 mm, and preferably about 100 mm.

It should be noted that the dimensions and the grammage of the adhesive to be applied under each baseplate cannot be increased excessively, since too much adhesive would impede the assembly of the said baseplates 25. In fact the latter must be flush with the elements of the primary thermal barrier 20 at the level of their external surfaces. If there is too much adhesive on the bottom surface, the latter will push the baseplate upwards, thus creating an undesirable discontinuity at this level, which has to receive the primary sealing membrane 10 of INVAR or stainless steel. Neither is it possible to apply the adhesive onto the totality of the bottom surface of the baseplate 25, since this would prevent the adhesive from spreading sideways, with the same negative result of a vertical force applied to the baseplate. The shapes, dimensions and grammage of the adhesive strips 26, 26' are therefore calculated precisely, firstly in order to ensure the creation of a substantially continuous adhesive layer after gluing, while also eliminating any risk of having too much adhesive, which would impede the assembly of the baseplate, and prevent circulation of the nitrogen.

When the glued baseplate 25 is assembled, it is pressed onto the flexible sheet strip 35 placed in the bottom of a channel 24, above an empty space 45 existing between two adjacent panels A. This pressure presses down onto the adhesive strips 26, 26' so that the adhesive spreads sideways not only toward the exterior, but also toward the interior, into the central space 28. After assembly, the invention provides that this central space is at least partially filled with adhesive, advantageously to at least 50% and preferably to 75% of its initial area. Thus a more-or-less continuous adhesive layer is obtained. Even if there remain small isolated zones with no adhesive, it has been observed that the creation of a more-or-less continuous adhesive layer above the flexible sheet strip 35 gives the latter much greater strength, in particular regarding its glue 36, which will reliably resist the most extreme stresses. On the other hand, with a gluing of the baseplates 25 in which no continuous adhesive layer is formed, it has been observed that the flexible sheet strip 35 is liable to exhibit weaknesses, and in particular to become detached, and thus give rise to leaks in the secondary sealing membrane.

Advantageously, as can be seen in FIG. 2, the adhesive layer 36 used to glue the flexible sheet strip 35 extends slightly beyond said flexible sheet strip 35. Thus, during the gluing of the baseplate 25, the adhesive 26, 26' of the baseplate 25 will come into contact with the adhesive 36 of the flexible sheet strip 35. This interaction between the adhesives is also favourable when the adhesive of the baseplate forms a more-or-less continuous adhesive layer after gluing.

The adhesive used to glue the baseplates 25 is preferably a polymerizable or curable adhesive of the two-component epoxy type with resin and hardener.

It is intended that those skilled in the art will be able to modify the method, described above by way of an example, without moving outside the scope of this present invention, as specified in the attached claims.

The invention claimed is:

1. A method for the creation of a wall for a heat-insulated tank for the containment of a fluid product incorporated into the bearing structure (50) of a ship, where the wall includes a primary sealing membrane (10) to contact the product contained in the tank, a primary thermal insulation barrier (20), a secondary sealing membrane (30) and a secondary thermal insulation barrier (40) connected to the bearing structure (50), where the secondary sealing membrane (30) and the secondary thermal insulation barrier (40) are formed by the assembly of prefabricated panels placed side-by-side, with an empty space (45) between two adjacent panels and a flexible sheet strip (35) being glued in a channel (24) above the empty space (45) between two adjacent panels in order to ensure the continuity of the secondary seal (30), where the primary thermal insulation barrier (20) is formed by the assembly of prefabricated panels placed onto panels to form a channel (24) above each empty space (45), whereby a generally rectangular prefabricated baseplate (25) is assembled in each channel (24) above each flexible sheet strip (35), characterised in that the assembly of the baseplate (25) includes the following:

a. application of two parallel longitudinal adhesive strips (26, 26') onto the bottom surface of the baseplate (25), the strips (26, 26') being separated by a longitudinal central space (28) with no adhesive, and b. gluing the glue-treated baseplate (25) in a channel (24) onto a flexible sheet strip (35), by pressure of the said baseplate (25) onto the flexible sheet strip (35), so that after gluing, the longitudinal central space (28) is at least partially filled with adhesive, thereby forming a substantially continuous adhesive layer on the bottom surface of the baseplate (25), which reinforces the gluing of the flexible sheet strip (35) in order to effect the seal of the secondary sealing membrane (30).

2. A method according to claim 1 in which, during application, the thickness of each longitudinal adhesive strip (26, 26') is between 3 and 4 mm.

3. A method according to claim 1 in which, during application, the width of each longitudinal adhesive strip (26, 26') is between 90 and 110 mm.

4. A method according to claim 3, in which said width is about 100 mm.

5. A method according to claim 1 in which, for a standard baseplate (25) whose tank side area is 1000 mm×250 mm, the total quantity of adhesive is between 765 g and 935 g.

6. A method according to claim 1 in which, for a standard baseplate (25) whose tank side area is 720 mm×250 mm, the total quantity of adhesive is between 550 g and 670 g.

7. A method according to claim 1 in which, before the gluing step, the width of the longitudinal central space (28) is between 10 mm and 20 mm.

8. A method according to claim 1 in which, after the gluing step, from at least 50% to, 75% of the initial area of the longitudinal central space (28) is filled with adhesive.

9. A method according to claim 1 in which the adhesive used to glue the baseplates (25) onto the flexible sheet strips (35) is a polymerizable adhesive of the two-component epoxy type.

10. A method according to claim 1, in which said fluid product is a liquefied gas.

* * * * *